United States Patent
Ozawa

(10) Patent No.: US 8,985,742 B2
(45) Date of Patent: Mar. 24, 2015

(54) LIQUID EJECTING HEAD AND LIQUID EJECTING APPARATUS

(71) Applicant: Seiko Epson Corporation, Shinjuku-ku, Tokyo (JP)

(72) Inventor: Kinya Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/060,995

(22) Filed: Oct. 23, 2013

(65) Prior Publication Data

US 2014/0118442 A1 May 1, 2014

(30) Foreign Application Priority Data

Oct. 26, 2012 (JP) ................. 2012-236412

(51) Int. Cl.
| | |
|---|---|
| *B41J 2/14* | (2006.01) |
| *G01D 11/00* | (2006.01) |
| *B41J 2/525* | (2006.01) |
| *C09D 11/32* | (2014.01) |
| *B41J 2/045* | (2006.01) |

(52) U.S. Cl.
CPC ............ *B41J 2/525* (2013.01); *C09D 11/32* (2013.01); *B41J 2/04581* (2013.01); *B41J 2/04588* (2013.01); *B41J 2/04595* (2013.01); *B41J 2/14274* (2013.01); *B41J 2202/11* (2013.01)
USPC .......................................... 347/47; 347/100

(58) Field of Classification Search
CPC .. B41J 2/04593; B41J 2/16508; B41J 2/2132; B41J 2/0458; B41J 2/14201; B41J 2002/14201; C09D 11/32; C09D 11/36; C09D 11/40; C09D 11/037; C09D 11/324
USPC .................. 347/24, 43, 57, 20, 100, 68, 71
See application file for complete search history.

(56) References Cited

U.S. PATENT DOCUMENTS

| | | | | |
|---|---|---|---|---|
| 6,154,230 | A * | 11/2000 | Holstun et al. | 347/19 |
| 6,409,295 | B1 * | 6/2002 | Norigoe | 347/11 |
| 7,059,710 | B2 * | 6/2006 | Ishikawa | 347/68 |
| 7,198,676 | B2 * | 4/2007 | Kiguchi | 118/696 |
| 8,132,907 | B2 * | 3/2012 | Kariya et al. | 347/105 |
| 2003/0011653 | A1 * | 1/2003 | Oikawa et al. | 347/15 |
| 2007/0126803 | A1 * | 6/2007 | Iriguchi | 347/68 |
| 2008/0145628 | A1 | 6/2008 | Oyanagi et al. | |
| 2009/0274840 | A1 * | 11/2009 | Yamakami et al. | 427/256 |
| 2010/0053267 | A1 * | 3/2010 | Seishin | 347/43 |
| 2011/0063351 | A1 * | 3/2011 | Kitaoka | 347/11 |
| 2011/0094411 | A1 * | 4/2011 | Oyanagi et al. | 106/31.9 |
| 2011/0139034 | A1 * | 6/2011 | Wczasek et al. | 106/31.69 |

(Continued)

FOREIGN PATENT DOCUMENTS

| | | |
|---|---|---|
| JP | 2004-098535 A | 4/2004 |
| JP | 2008-174712 A | 7/2008 |

*Primary Examiner* — Matthew Luu
*Assistant Examiner* — Patrick King
(74) *Attorney, Agent, or Firm* — Kilpatrick Townsend & Stockton LLP

(57) ABSTRACT

There is provided a liquid ejecting head in which a flow path width Wc of a pressure chamber is equal to or larger than 60 μm, and when a-50% average particle diameter of a quasi-diameter obtained based on a maximum projected area of glitter pigment is assumed to be R50, a maximum particle diameter of the quasi-diameter is assumed to be Rmax, and a thickness of the glitter pigment for the quasi-diameter is assumed to be Z, equations of $0.8 \leq R50 \leq 1.1$, $0.2 > Z/R50 \geq 0.02$, and $Rmax/Wc < 0.1$ are satisfied.

6 Claims, 6 Drawing Sheets

(56) References Cited

U.S. PATENT DOCUMENTS

| | | | |
|---|---|---|---|
| 2011/0228023 A1* | 9/2011 | Ozawa | 347/98 |
| 2012/0029121 A1* | 2/2012 | Ormerod et al. | 524/32 |
| 2012/0056922 A1* | 3/2012 | Yoshida | 347/9 |
| 2012/0313990 A1* | 12/2012 | Sakai | 347/12 |

* cited by examiner

FIG. 6

| FqM | | Rmax/Wc | | | | |
|---|---|---|---|---|---|---|
| | kHz | 0.01 | 0.05 | 0.1 | 0.15 | 0.2 |
| | 1 | GOOD | GOOD | GOOD | GOOD | GOOD |
| | 10 | GOOD | GOOD | GOOD | GOOD | NOT SO GOOD |
| | 15 | GOOD | GOOD | GOOD | NOT SO GOOD | NOT GOOD |
| | 20 | GOOD | GOOD | GOOD | NOT SO GOOD | NOT GOOD |
| | 30 | GOOD | GOOD | NOT SO GOOD | NOT GOOD | NOT GOOD |
| | 40 | GOOD | NOT SO GOOD | NOT GOOD | NOT GOOD | NOT GOOD |

LIQUID EJECTING HEAD AND LIQUID EJECTING APPARATUS

BACKGROUND

1. Technical Field

The present invention relates to a liquid ejecting head such as an ink jet recording head and a liquid ejecting apparatus. In particular, the invention relates to a liquid ejecting head that ejects liquid containing flat plate-like particles such as glitter pigment and a liquid ejecting apparatus.

2. Related Art

A liquid ejecting apparatus is an apparatus that includes a liquid ejecting head capable of ejecting liquid as ink droplets through nozzles and ejects various types of liquids from the liquid ejecting head. As a representative liquid ejecting apparatus, there is an image recording apparatus such as an ink jet recording apparatus (printer), for example. The ink jet recording apparatus includes an ink jet recording head (hereinafter, referred to as recording head) and ejects liquid-state ink as ink droplets through nozzles of the recording head so as to perform recording. In addition to this, the liquid ejecting apparatuses are used for ejection of various types of liquids such as a coloring material to be used for a color filter of a liquid crystal display or the like, an organic material to be used for an organic electroluminescence (EL) display, and an electrode material to be used for forming an electrode. A recording head for an image recording apparatus ejects liquid-state ink and a coloring material ejecting head for a display manufacturing apparatus ejects solutions of respective coloring materials of red (R), green (G), and blue (B). Further, an electrode ejecting head for an electrode forming apparatus ejects a liquid-state electrode material and a bioorganic matter ejecting head for a chip manufacturing apparatus ejects a solution of bioorganic matter.

In the liquid ejecting head employing an ink jet technique, there are provided a plurality of nozzles, pressure chambers formed for the respective nozzles, a common liquid chamber (also referred to as reservoir or manifold) common to the plurality of pressure chambers, and a liquid flow path constituted by supply paths that make the common liquid chamber and the respective pressure chambers communicate with each other, and the like. The liquid ejecting head is configured as follows. Pressure generation units such as piezoelectric elements or heat generation elements are driven to generate pressure fluctuation on liquid in the pressure chambers so that the liquid is ejected through the nozzles by using the pressure fluctuation.

In recent years, as an application example of the ink jet technique, an application in which metallic ink containing metal particles (one type of glitter pigment) as pigment is ejected is exemplified (for example, JP-A-2008-174712). In order to obtain metallic glossiness on a printed matter using the metallic ink, it is desired that the surfaces of the metal particles are as flat as possible. Therefore, the glitter pigment contained in the metallic ink is formed with flat plate-like (scale-like) particles.

Recently, recording heads have made a large progress in providing higher resolution and a nozzle formation pitch tends to be narrower. Along with this, the widths of the flow paths in the pressure chambers and the like become narrower. As the widths of the flow paths in the pressure chambers and the like are narrower, influence by viscous resistance on flow of ink in the vicinity of the flow path inner walls is larger. That is to say, turbulence flow (eddy flow) is generated on the ink in the pressure chambers due to boundary layer separation or the like. When the metallic ink is used, the flat plate-like particles revolve in a local region due to the eddy flow. If the flat plate-like particles revolve in a narrow range in the pressure chambers, there arises a problem that ink ejection is unstable. To be more specific, the flying direction of ink that is ejected through the nozzles is bent, an amount of ink that is ejected varies, and mist is easy to be generated. In the worst case, there arises a problem of a so-called missing dot that ink is not ejected.

The above-mentioned problems arise not only on the ink jet recording head that ejects the metallic ink but also other liquid ejecting heads that eject liquids containing flat plate-like particles.

SUMMARY

An advantage of some aspects of the invention is to provide a liquid ejecting head that is capable of suppressing failures of liquid ejection due to revolution of flat plate-like particles on a local region in a flow path in a configuration in which glitter pigment liquid containing the flat plate-like particles is ejected, and a liquid ejecting apparatus.

A liquid ejecting head according to an aspect of the invention includes a pressure chamber communicating with a nozzle for ejecting liquid and ejects glitter pigment liquid containing glitter pigment formed with flat plate-like particles through the nozzle by generating pressure fluctuation in the pressure chamber. In the liquid ejecting head, a flow path width Wc of the pressure chamber is assumed to be equal to or larger than 60 μm, and when a 50%-average particle diameter of a quasi-diameter of an area when this area is assumed to be circular (hereinafter, referred to as a "quasi-diameter") obtained based on a maximum projected area of the glitter pigment is assumed to be R50, a maximum particle diameter of the quasi-diameter is assumed to be Rmax, and a thickness of the glitter pigment for the quasi-diameter is assumed to be Z, then equations of $0.8 \leq R50 \leq 1.1$, $0.2 > Z/R50 \geq 0.02$, and $Rmax/Wc < 0.1$ are satisfied.

According to the aspect of the invention, the flow path width Wc of the pressure chamber is set to be equal to or larger than 60 μm, and when the 50%-average particle diameter of the quasi-diameter of the glitter pigment is assumed to be R50, the maximum particle diameter of the quasi-diameter is assumed to be Rmax, and the thickness of the glitter pigment for the quasi-diameter is assumed to be Z, the conditions of $0.8 \leq R50 \leq 1.1$, $0.2 > Z/R50 \geq 0.02$, and $Rmax/Wc < 0.1$ are satisfied. With this, when the glitter pigment liquid containing the glitter pigment formed with the flat plate-like particles is ejected, the glitter pigment is unlikely to be influenced by viscous resistance in the pressure chamber and flows toward the nozzle smoothly. This suppresses unstable ejection in the configuration in which the glitter pigment liquid containing the glitter pigment is ejected through the nozzle. That is to say, failures including fly-bending of the glitter pigment liquid that is ejected through the nozzle and a so-called missing dot that the glitter pigment liquid is not ejected through the nozzle can be prevented. Further, the ejection frequency necessary for practical use can be ensured while ensuring the ejection stability.

In the liquid ejecting head according to the aspect of the invention, it is preferable that first liquid containing the glitter pigment and second liquid containing, as pigment, a coloring material other than the glitter pigment be capable of being ejected, and when a design value of a weight per droplet of the first liquid that is ejected through the nozzle is assumed to be IwM, a design value of a flying speed of one droplet of the first liquid is assumed to be VmM, a design value of a weight per droplet of the second liquid is assumed to be IwC, and a design value of a flying speed of one droplet of the second liquid is VmC, equations of IwM<IwC and VmM<VmC be satisfied.

With this configuration, a flow rate of the first liquid in the pressure chamber per unit time can be suppressed, so that ejection stability is further improved. Furthermore, excess deposition of the glitter pigment on a landing target such as a recording medium can be suppressed, thereby improving glossiness while ensuring ejection stability.

In the liquid ejecting head according to the aspect of the invention, it is preferable that when a maximum ejection frequency of the first liquid is assumed to be FqM, and a maximum ejection frequency of the second liquid is assumed to be FqC, an equation of FqM<FqC be satisfied.

With this configuration, the maximum ejection frequency FqM of the first liquid is set to be lower than the maximum ejection frequency FqC of the second liquid. This can contribute to improvement in ejection stability and improvement in glossiness of a recorded image and the like.

A liquid ejecting apparatus according to another aspect of the invention includes the liquid ejecting head having any one of the above-mentioned configurations.

With the aspect of the invention, the above-mentioned liquid ejecting head is employed. With this, even when the glitter pigment liquid containing the glitter pigment formed with the flat plate-like particles is ejected, unstable ejection is suppressed. That is to say, failures including fly-bending of the glitter pigment liquid that is ejected through the nozzle and a so-called missing dot that the glitter pigment liquid is not ejected through the nozzle can be prevented. As a result, reliability of the liquid ejecting apparatus can be further improved.

BRIEF DESCRIPTION OF THE DRAWINGS

The invention will be described with reference to the accompanying drawings, wherein like numbers reference like elements.

FIG. 6 is a table illustrating ejection stability when Rmax/Wc and a maximum ejection frequency FqM of metallic ink are changed.

DESCRIPTION OF EXEMPLARY EMBODIMENTS

Hereinafter, a mode for carrying out the invention is described with reference to the accompanying drawings. In an embodiment which will be described below, various limitations are made as a preferable specific example of the invention. However, the scope of the invention is not limited to the embodiment unless description limiting the invention is particularly made in the following explanation. Further, a liquid ejecting head according to the invention is explained by taking a recording head 2 as one type of the liquid ejecting head, hereinafter.

Figure 1:
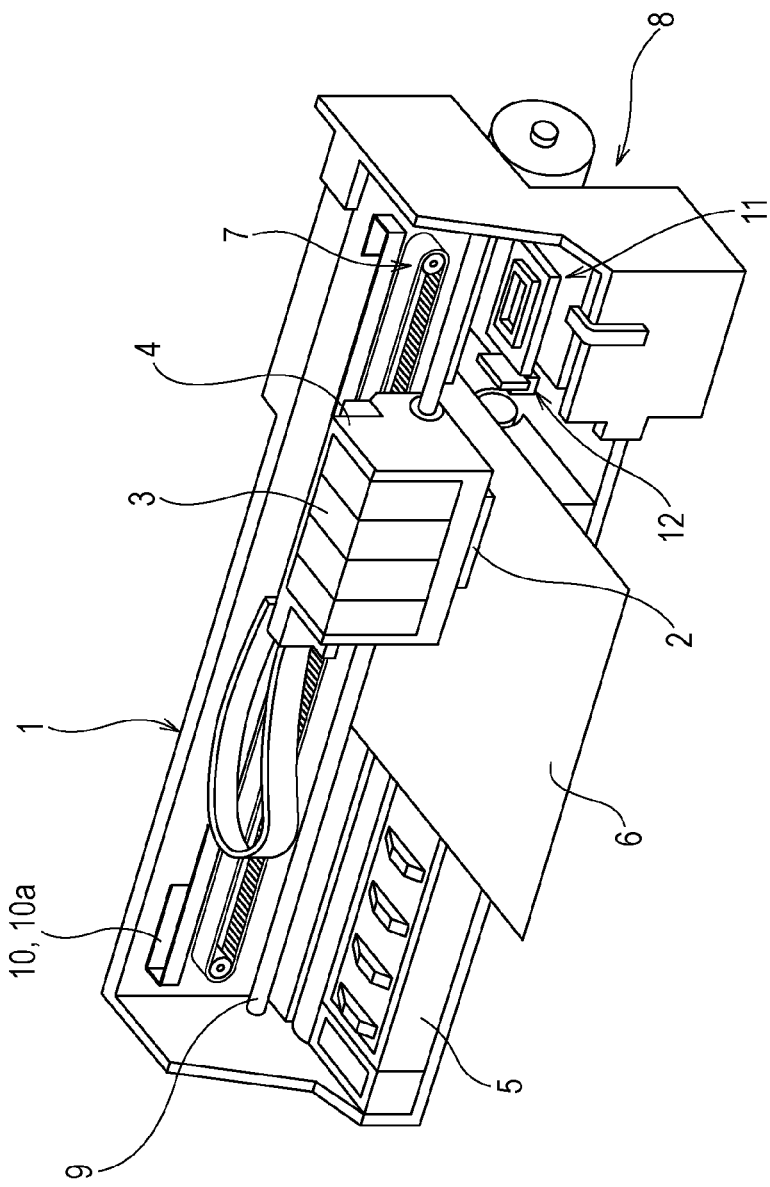
FIG. 1 is a perspective view for explaining an inner configuration of a printer.

FIG. 1 is a perspective view illustrating a configuration of a printer 1. The printer 1 includes a carriage 4, a platen 5, a carriage movement mechanism 7, and a transportation mechanism 8. The recording head 2 as one type of the liquid ejecting head is attached to the carriage 4. An ink cartridge 3 as one type of a liquid supply source is attached to the carriage 4 in a detachable manner. The platen 5 is arranged at the lower side of the recording head 2 at the time of a recording operation. The carriage movement mechanism 7 makes the carriage 4 reciprocate in the sheet width direction of a recording sheet 6 (one type of a recording medium and a landing target), that is, the main scanning direction. The transportation mechanism 8 transports the recording sheet 6 in the sub scanning direction orthogonal to the main scanning direction.

The carriage 4 is attached in a state of being axially supported by a guide rod 9 provided along the main scanning direction. The carriage 4 is configured so as to move in the main scanning direction along the guide rod 9 with an operation of the carriage movement mechanism 7. A position of the carriage 4 in the main scanning direction is detected by a linear encoder 10 and a detection signal thereof, that is, an encoder pulse (one type of positional information) is transmitted to a printer controller 51 (see, FIG. 4). The linear encoder 10 is one type of a positional information output unit and outputs an encoder pulse EP in accordance with a scanning position of the recording head 2 as positional information in the main scanning direction. The linear encoder 10 includes a linear scale 10a and a detector (not illustrated). The linear scale 10a is provided on an inner wall of a rear surface of a frame along the main scanning direction in a stretched manner. The detector is attached to the rear surface of the carriage 4. As a detection system of the linear encoder 10, there are an optical system, a magnetic system, and the like. In the embodiment, the optical system is employed. The linear scale 10a is constituted by a band-like resin film. In the embodiment, a plurality of longitudinal slits (not illustrated) (slits elongated in the band width direction) are formed along the lengthwise direction of a base material of the linear scale 10a. The detector outputs an encoder pulse in accordance with a difference between a light receiving state on the slits of the linear scale 10a and a light receiving state on portions other than the slits.

A home position as a base point of scanning of the carriage is set at an outer end region relative to a recording region in a movement range of the carriage 4. A capping member 11 and a wiper member 12 are arranged at the home position in the embodiment. The capping member 11 seals a nozzle formation surface (nozzle plate 24: see, FIG. 2) of the recording head 2. The wiper member 12 wipes the nozzle formation surface. The printer 1 is configured so as to perform so-called bidirectional recording. The bidirectional recording is a recording method in which characters, images, and the like are recorded on the recording sheet 6 in both directions at the forward time when the carriage 4 moves from the home position toward the opposite end portion and at the backward time when the carriage 4 is returned to the home position side from the opposite end portion.

Figure 2:
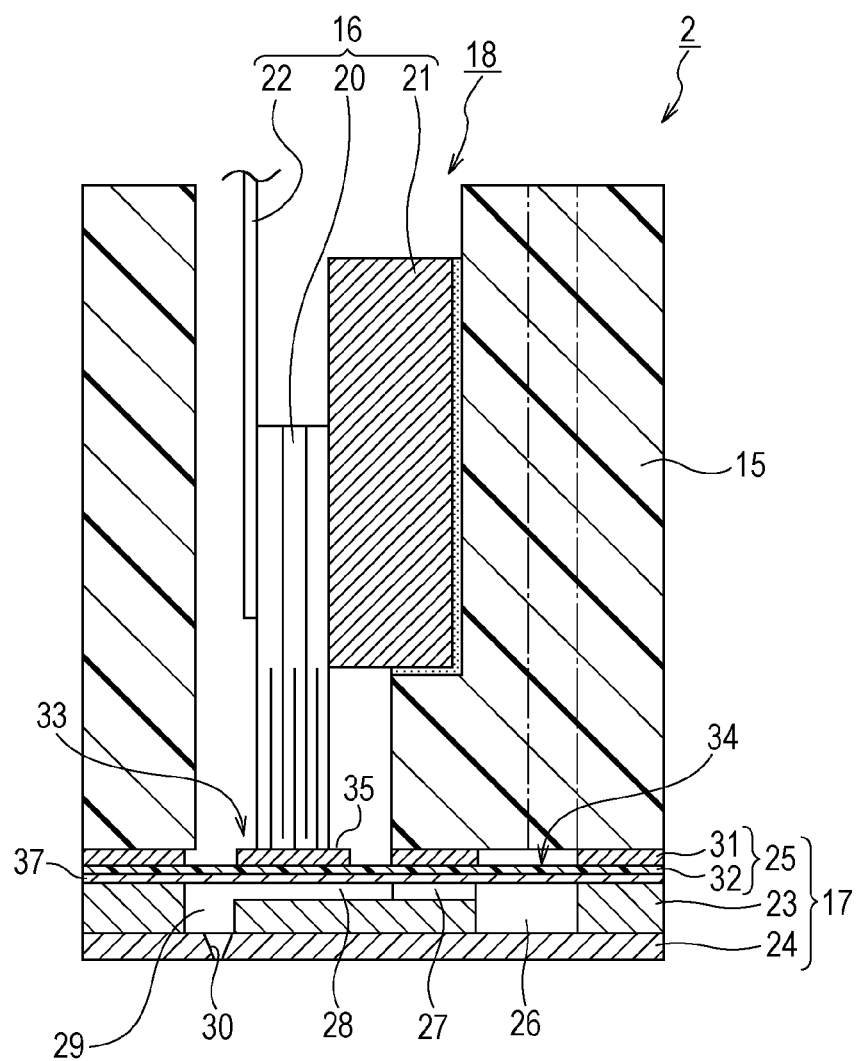
FIG. 2 is a cross-sectional view for explaining a main part configuration of a recording head.

FIG. 2 is a cross-sectional view for explaining a main part configuration of the recording head 2. The recording head 2 includes a case 15, a vibrator unit 16, and a flow path unit 17. The vibrator unit 16 is accommodated in the case 15. The flow path unit 17 is bonded to the bottom surface (front end surface) of the case 15. The above-mentioned case 15 is made of an epoxy-based resin, for example, and an accommodation hollow portion 18 for accommodating the vibrator unit 16 is formed in the case 15. The vibrator unit 16 includes piezoelectric elements 20 functioning as one type of a pressure generation unit, a fixing plate 21, and a flexible cable 22. The piezoelectric elements 20 are bonded to the fixing plate 21.

The flexible cable 22 is a cable for supplying a driving signal to the piezoelectric elements 20. Further, the flow path unit 17 is configured as follows. That is, the nozzle plate 24 is bonded to one surface of a flow path formation substrate 23 and a vibration plate 25 is bonded to the other surface of the flow path formation substrate 23. The piezoelectric elements 20 in the embodiment are piezoelectric elements in a so-called longitudinal vibration mode, which are deformed in the direction orthogonal to the electric field direction, and are deformed (expand and contract) in the direction orthogonal to the lamination direction of piezoelectric members and electrodes if a driving signal is supplied thereto.

Figure 3:
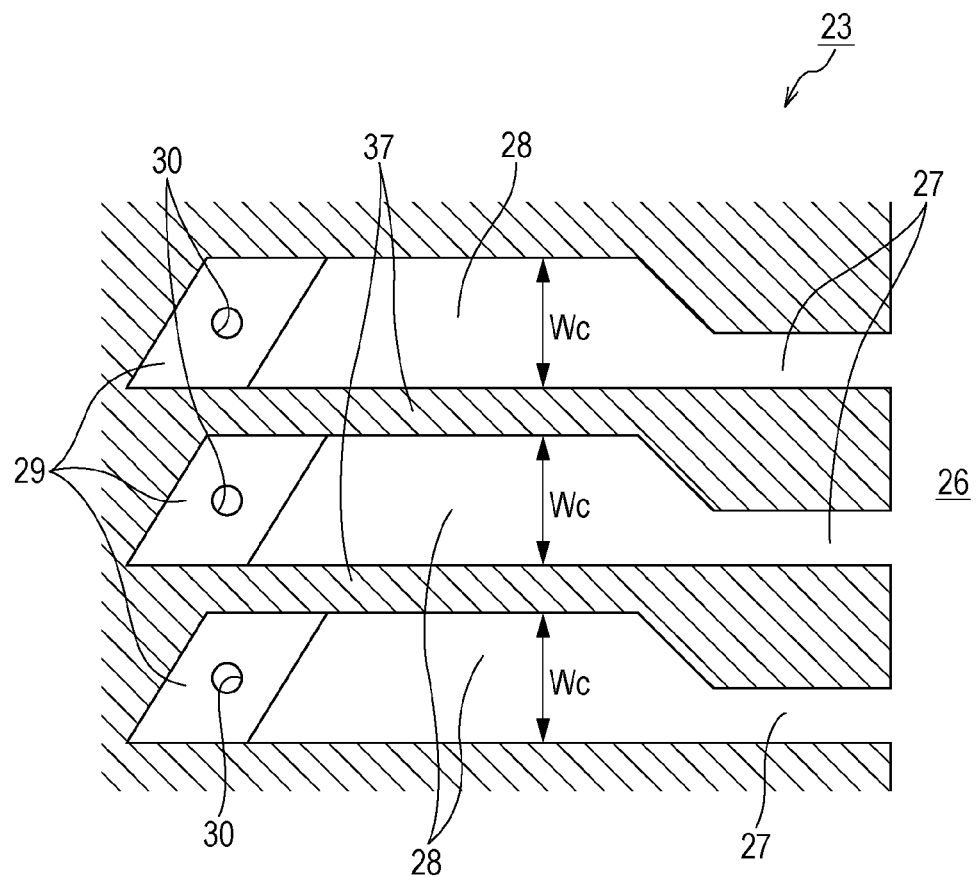
FIG. 3 is a plan view illustrating for explaining a main part configuration of a flow path formation substrate.

FIG. 3 is a plan view illustrating a main part of the flow path formation substrate 23. Although FIG. 3 illustrates a configuration of three nozzles, configurations of ink flow paths corresponding to other nozzles 30 are the same. The flow path unit 17 is provided with a reservoir 26 (common liquid chamber), ink supply paths 27, pressure chambers 28, nozzle communication ports 29, and the nozzles 30. A continuous ink flow path (liquid flow path) from the ink supply path 27 to the nozzle 30 through the pressure chamber 28 and the nozzle communication port 29 is formed so as to correspond to each nozzle 30.

The flow path formation substrate 23 is a plate material made of a silicon single crystal substrate, for example. The plurality of pressure chambers 28 are arranged on the flow path formation substrate 23 in parallel in the width direction (nozzle row direction) while separation walls 37 are arranged between the adjacent pressure chambers 28. The reservoir 26 is formed on the flow path formation substrate 23 on a region deviated to the outer side in the lengthwise direction of the pressure chambers 28 (direction orthogonal to the nozzle row direction). The reservoir 26 and the respective pressure chambers 28 communicate with each other through the ink supply paths 27 provided for the respective pressure chambers 28. The flow path cross-section (cross-section in the nozzle row direction) of the ink supply paths 27 is smaller than the cross-section of the pressure chambers 28. In the embodiment, the widths of the ink supply paths 27 in the nozzle row direction are formed to be smaller than the widths Wc of the pressure chambers 28 in the same direction. The widths Wc of the pressure chambers 28 are set to be equal to or larger than 60 μm. The nozzle communication ports 29 are formed on bottom surfaces of end portions of the pressure chambers 28 at the opposite side to the ink supply paths 27. The nozzle communication ports 29 penetrate through the flow path formation substrate 23 in the thickness direction. The nozzle communication ports 29 communicate with the nozzles 30 formed on the nozzle plate 24 bonded to one surface of the flow path formation substrate 23 on a one-to-one basis. The height of the nozzle communication ports 29 (distance from the bottom surfaces of the pressure chambers 28 to the nozzles 30) is set to be equal to or larger than 5 μm. The pressure chambers 28, the ink supply paths 27, and the nozzle communication ports 29 on the flow path formation substrate 23 are formed by anisotropic etching.

The above-mentioned nozzle plate 24 is a thin plate made of a metal such as stainless steel. The plurality of nozzles 30 are provided on the nozzle plate 24 in a row at a pitch corresponding to a dot formation density. The nozzle plate 24 is provided with a plurality of nozzle rows (nozzle groups) on which the nozzles 30 are provided in a row. For example, one nozzle row is constituted by 180 nozzles 30. Since the widths Wc of the pressure chambers 28 are set to be equal to or larger than 60 μm, less than 300 nozzles are formed per inch desirably as the formation pitch of the nozzles 30.

The above-mentioned vibration plate 25 has a double-layered structure in which an elastic film 32 is laminated on a surface of a supporting plate 31. In the embodiment, the vibration plate 25 is formed by using a composite plate material. The composite plate material is obtained by using a stainless plate as one type of a metal plate as the supporting plate 31 and laminating a resin film as the elastic film 32 on the surface of the supporting plate 31. The vibration plate 25 is provided with diaphragm portions 33 that change volumes of the pressure chambers 28. Further, the vibration plate 25 is provided with a compliance portion 34 that seals a part of the reservoir 26.

The above-mentioned diaphragm portions 33 are formed by partially removing the supporting plate 31 by etching or the like. That is to say, the diaphragm portions 33 are formed by island portions 35 and thin elastic portions. Front end surfaces of free end portions of the piezoelectric elements 20 are bonded to the island portions 35. The thin elastic portions surround the island portions 35. The above-mentioned compliance portion 34 is formed by removing the supporting plate 31 on a region opposed to an opening surface of the reservoir 26 by etching or the like in the same manner as in the case of the diaphragm portions 33. The compliance portion 34 functions as a damper that absorbs pressure fluctuation of liquid stored in the reservoir 26.

The front end surfaces of the piezoelectric elements 20 are bonded to the above-mentioned island portions 35. Therefore, the free end portions of the piezoelectric elements 20 are made to expand and contract so as to fluctuate the volumes of the pressure chambers 28. The volume fluctuation causes pressure fluctuation in the ink in the pressure chambers 28. Then, the recording head 2 ejects ink through the nozzles 30 by using the pressure fluctuation.

Next, an electric configuration of the printer 1 is explained.

Figure 4:
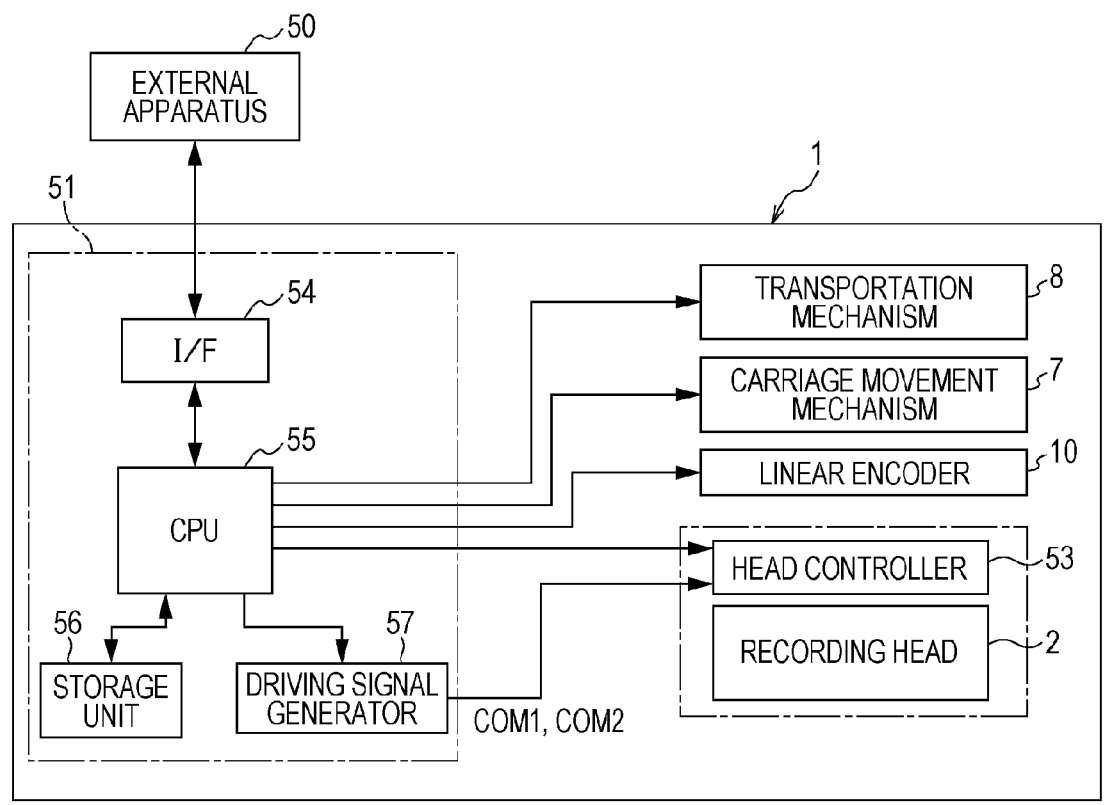
FIG. 4 is a block diagram for explaining an electric configuration of the printer.

FIG. 4 is a block diagram for explaining the electric configuration of the printer 1. An external apparatus 50 is an electronic apparatus such as a computer or a digital camera that handles images, for example. The external apparatus 50 is connected to the printer 1 in a communicable manner. In order to cause the printer 1 to print images or texts on the recording medium such as the recording sheet 6, the external apparatus 50 transmits print data in accordance with the images or the like to the printer 1.

The printer 1 in the embodiment includes the transportation mechanism 8, the carriage movement mechanism 7, the linear encoder 10, the recording head 2, a head controller 53, and the printer controller 51.

The printer controller 51 is a control unit for controlling the respective parts of the printer. The printer controller 51 includes an interface (UF) unit 54, a CPU 55, a storage unit 56, and a driving signal generator 57. The interface unit 54 performs transmission of print data and a print command and also performs reception and transmission of state data of the printer. That is, the print data and the print command are transmitted from the external apparatus 50 to the printer 1 through the interface unit 54 and the state information of the printer 1 is received by the external apparatus 50 through the interface unit 54. The CPU 55 is an arithmetic processing unit for controlling the printer overall. The storage unit 56 is an element that stores programs to be executed by the CPU 55 and data to be used in various type of control, and that includes a ROM, a RAM, and an NVRAM (non-volatile storage element). The CPU 55 controls the respective units in accordance with the programs stored in the storage unit 56.

The CPU 55 functions as a timing pulse generator for generating a timing pulse PTS from the encoder pulse EP that is output from the linear encoder 10. Then, the CPU 55 controls transfer of print data, generation of driving signals COM1 and COM2 by the driving signal generator 57, and the like in synchronization with the timing pulse PTS. Further, the CPU 55 generates a timing signal such as a latch signal LAT based on the timing pulse PTS and outputs the generated timing signal to a head controller 53 of the recording head 2. The head controller 53 controls application of an ejection driving pulse (see, FIG. 5) of a driving signal to the piezoelectric elements 20 of the recording head 2 based on a head control signal (print data and timing signal) from the printer controller 51, and so on.

The driving signal generator 57 generates an analog voltage signal based on waveform data relating to a waveform of the driving signal. Further, the driving signal generator 57 amplifies the above-mentioned voltage signal so as to generate the driving signal COM. The printer 1 in the embodiment is configured so as to eject two types of inks including common color ink (one type of color pigment liquid in the invention) containing pigment or dye as a coloring material and metallic ink (one type of glitter pigment liquid in the invention) containing glitter pigment, as will be described later. In order to correspond thereto, the driving signal generator 57 is configured to generate two types of driving signals including the first driving signal COM1 that is used for ejection of the color ink and the second driving signal COM2 that is used for ejection of the metallic ink.

Figure 5:
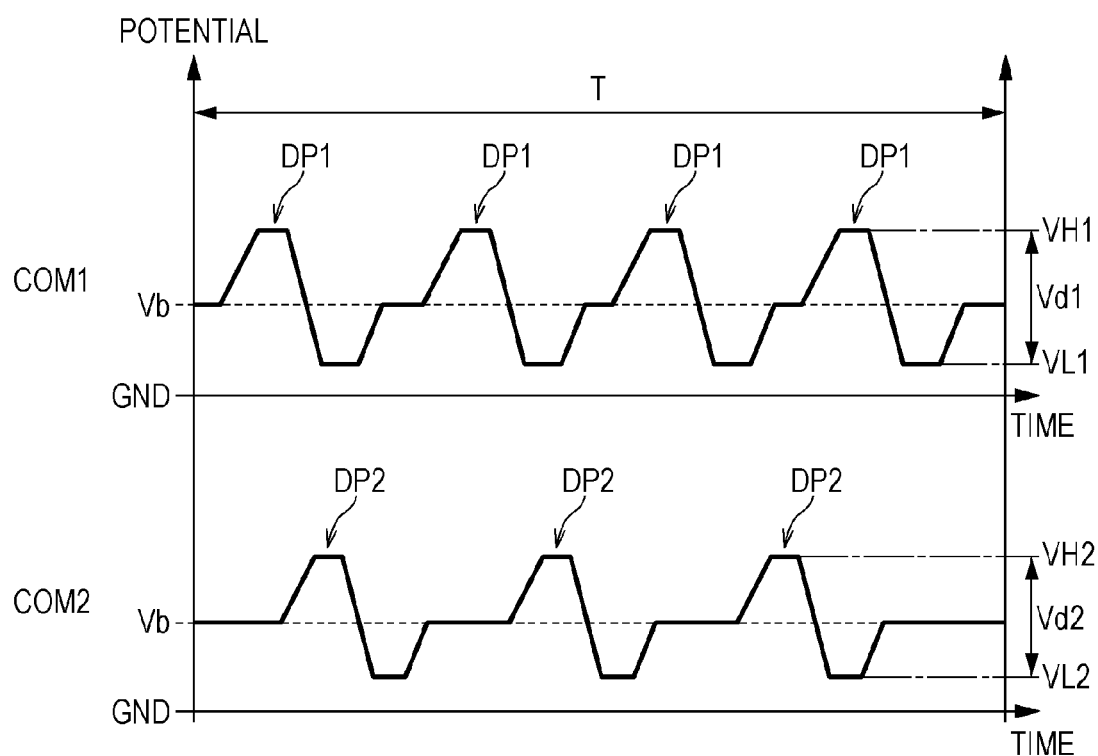
FIG. 5 is a waveform diagram for explaining configurations of driving signals.

FIG. 5 is a waveform diagram for explaining an example of configurations of the first driving signal COM1 and the second driving signal COM2. These driving signals COM1 and COM2 are generated repeatedly from the driving signal generator 57 at the timing based on the timing pulse PTS. A generation period of these driving signals COM1 and COM2 is assumed to be T.

The first driving signal COM1 in the embodiment includes four first ejection driving pulses DP1 in total in the generation period T. The first driving signal COM1 is a driving signal that is used when the color ink (one type of second liquid in the invention) is ejected onto the recording medium (recording sheet 6) and color images, texts, and the like are recorded (printed). The first ejection driving pulse DP1 is a driving pulse of which driving voltage Vd1 (potential difference between a minimum potential VL1 and a maximum potential VH1), waveform, and the like are defined in order to eject the color ink for a predetermined amount through the nozzles 30. Further, the size of dots that are recorded on the recording medium is changed in accordance with the selected number of the first ejection driving pulses DP1 contained in the first driving signal COM1. To be more specific, if all four first ejection driving pulses DP1 of the first driving signal COM1 are selected and applied to the piezoelectric elements 20, the color ink is ejected through the nozzles 30 four times continuously. If the color ink lands on a predetermined pixel region on the recording medium, large dots are formed. In the same manner, if two first ejection driving pulses DP1 are selected and applied to the piezoelectric elements 20, the color ink is ejected through the nozzles 30 twice continuously and middle dots are formed on the recording medium. Further, if one first ejection driving pulse DP1 is selected and applied to the piezoelectric elements 20, the color ink is ejected through the nozzles 30 once and small dots are formed on the recording medium. It is to be noted that "large", "middle", and "small" indicating the sizes of the dots are relative, and the size and a liquid amount of actual dots are defined in accordance with the specifications of the printer 1.

The second driving signal COM2 in the embodiment includes three second ejection driving pulses DP2 in total in the generation period T. The second driving signal COM2 is a driving signal that is used when the metallic ink (one type of first liquid in the invention) is ejected onto the recording medium and flat plate-like glitter pigment is made to adhere thereto so as to record images and the like having glossiness. The second ejection driving pulse DP2 is a driving pulse of which driving voltage Vd2 (potential difference between a minimum potential VL2 and a maximum potential VH2), waveform, and the like are defined in order to eject the metallic ink for a predetermined amount through the nozzles 30. To be more specific, the driving voltage Vd2 of the second ejection driving pulse DP2 is set to be lower than the driving voltage Vd1 of the first ejection driving pulse DP1. Therefore, a weight (or volume) IwM and a flying speed VmM per droplet of the metallic ink that is ejected through the nozzles 30 by applying the second ejection driving pulse DP2 to the piezoelectric elements 20 are set to be lower than a weight (or volume) IwC and a flying speed VmC per droplet of the color ink that is ejected through the nozzles 30 by applying the first ejection driving pulse DP1 to the piezoelectric elements 20. The above-mentioned weight and flying speed are design values as targets in consideration of the specifications and design of the printer 1.

Then, the size of the dots that are recorded on the recording medium is changed in accordance with the selected number of the ejection driving pulses contained in the second driving signal COM2. To be more specific, if all three second ejection driving pulses DP2 are selected and applied to the piezoelectric elements 20 sequentially, the metallic ink is ejected through the nozzles 30 three times continuously. If the metallic ink lands on a predetermined pixel region on the recording medium, large dots are formed. In the same manner, if two second ejection driving pulses DP2 are selected and applied to the piezoelectric elements 20, the metallic ink is ejected through the nozzles 30 twice continuously and middle dots are formed on the recording medium. Further, if one second ejection driving pulse DP2 is selected and applied to the piezoelectric elements 20, the metallic ink is ejected through the nozzles 30 once and small dots are formed on the recording medium. Thus, the number of the second ejection driving pulses DP2 contained in the second driving signal COM2 is smaller than the number of the first ejection driving pulses DP1 contained in the first driving signal COM1. Therefore, a maximum ejection frequency FqM of the metallic ink is lower than a maximum ejection frequency FqC of the color ink. It is to be noted that FqM is desirably equal to or higher than 30 kHz in practical use.

If at least the above-mentioned conditions are satisfied, the number of the first ejection driving pulses DP1 contained in the first driving signal COM and the waveform of the first ejection driving pulse DP1, or the number of the second ejection driving pulses DP2 contained in the second driving signal COM2 and the waveform of the second ejection driving pulse DP2 are not limited to those as exemplified above.

Next, the metallic ink containing the glitter pigment is described. As the glitter pigment, there are metal pigment made of a metal such as aluminum, pearl pigment obtained by coating a surface of mica with metal oxide, and the like, for example. The particles forming the glitter pigment exhibit flattened plate shapes (scale shapes). The "flat plate-like particle" is a particle having a substantially flat surface (X-Y plane) and having the thickness Z that is small enough relative to each of X and Y or a quasi-diameter on the X-Y plane. The "quasi-diameter" is a diameter of a circle having an area equivalent to a projected area of the flat plate-like particle of the glitter pigment on the substantially flat surface (X-Y plane). The "substantially flat surface" is a surface on which the projected area of the flat plate-like particle is maximum. The glitter pigment in the embodiment is formed by crushing a metal evaporated film.

As for the above-mentioned glitter pigment, when a 50%-average particle diameter of the quasi-diameter is assumed to be R50, a maximum particle diameter thereof is assumed to be Rmax, and the thickness of the glitter pigment for the quasi-diameter is assumed to be Z, the size of the particle is adjusted so as to satisfy the following conditions (1) to (3):

$$0.8 \leq R50 \leq 1.1 \quad (1)$$

$$0.2 > Z/R50 \geq 0.02 \quad (2)$$

$$R\text{max}/Wc < 0.1 \quad (3)$$

For the condition (1), if the average particle diameter R50 is set to be in the range, the glitter pigment is unlikely to be influenced by viscous resistance in the pressure chambers 28 of which widths are equal to or larger than 60 μm so as to suppress revolution of the glitter pigment. The condition (2) defines the shape of the glitter pigment as the flat plate-like particles that can give glossiness required when the glitter pigment has landed on the recording medium while ensuring ejection stability. The 50%-average particle diameter R50 of the quasi-diameter on the longer diameter (X direction)-shorter diameter (Y direction) plane of each metallic pigment and the average film thickness Z thereof were measured by using a particle shape and particle size analyzer (FPIA-3000S manufactured by Sysmex). Further, R50/Z was calculated based on the obtained measured values of R50 and Z. It is to be noted that the 50%-average particle diameter and the maximum particle diameter are particle diameters based on the number of particle sizes observed. Further, the thickness Z was measured by using a transmission electron microscope or a scanning electron microscope. For example, a transmission electron microscope (TEM, JEOL, JEM-2000EX), a field emission-type scanning electron microscope (FE-SEM, Hitachi, S-4700), and the like can be cited for that use. The thickness Z is an average thickness and is an average value obtained by performing the above-mentioned measurement ten times. The condition (3) defines the maximum particle diameter of the glitter pigment with which ejection stability can be ensured in consideration of the pressure chambers 28 having the widths of equal to or larger than 60 μm. It is possibly considered that discussion similar to the common boundary layer theory be made for the liquid in the pressure chambers. The glitter pigment is likely to revolve in the vicinity of an interface while receiving an influence of viscosity. There are regions away from walls by a constant distance (boundary layer thickness in the boundary layer theory) on which flow velocity of the liquid is lower than a flow velocity of main stream. If the region occupies a large area of the width of the pressure chambers, the glitter pigment is likely to revolve and ejection tends to be unstable. That is to say, if the particle diameter of the pigment is larger, the widths of the pressure chambers need to be larger. Details of the condition (3) will be described later with reference to FIG. 6.

In the recording head 2 in which the widths Wc of the pressure chambers 28 are set to be equal to or larger than 60 μm, if the metallic ink containing the glitter pigment satisfying the above-mentioned conditions (1) to (3) is used, the metallic ink is unlikely to be influenced by viscous resistance in the vicinity of inner walls in the pressure chambers 28 so as to suppress generation of eddy flow. This suppresses revolution of the glitter pigment due to the eddy flow and the glitter pigment flows toward the nozzles 30 smoothly. As a result, unstable ejection in a configuration in which the glitter pigment is ejected through the nozzles 30 is suppressed. That is to say, failures including fly-bending of the metallic ink that is ejected through the nozzles 30 and a so-called missing dot that the metallic ink is not ejected through the nozzles 30 can be prevented.

Further, in the embodiment, the weight IwM and the flying speed VmM of the metallic ink per droplet are set to be lower than the weight IwC and the flying speed VmC of the color ink per droplet intentionally. Therefore, a flow rate of the metallic ink in the pressure chambers 28 per unit time is suppressed and the ejection stability of the metallic ink is also ensured in this point. Further, if an excessive amount of the glitter pigment is deposited on the landing target such as the recording medium, glossiness tends to be lost. However, different action effects of improvement in ejection stability and improvement in glossiness of a recorded image can be achieved by causing the weight IwM and the flying speed VmM to be lower.

In the embodiment, the maximum ejection frequency FqM of the metallic ink is set to be lower than the maximum ejection frequency FqC of the color ink, thereby contributing to the improvement in ejection stability and improvement in glossiness of a recorded image and the like.

FIG. 6 is a table illustrating ejection stability when Rmax/Wc of the condition (3) and the maximum ejection frequency FqM of the metallic ink are changed. In this example, "○" indicates that ejection stability with no problem for image quality of a recorded image is ensured. "▲" indicates that ejection stability is lower than the case of "○" to possibly influence image quality of the recorded image and indicates limitation to an allowable range. "x" indicates that ejection stability is further lower than the case of "▲" and image quality of the recorded image is adversely influenced. This example is based on the assumption that the above-mentioned conditions (1) and (2) are satisfied. Further, in this example, the target is set such that the ejection stability is ensured when FqM is equal to or higher than 30 kHz. From this viewpoint, when the value of Rmax/Wc is equal to or larger than 0.1, if FqM is equal to or higher than 30 kHz, the ejection stability is "x" or "▲" and is not ensured. On the other hand, when the value of Rmax/Wc is lower than 0.1, if FqM is equal to or higher than 30 kHz, the ejection stability is at least "○" or "▲" and is ensured. Accordingly, if the condition 3) is satisfied, a necessary maximum ejection frequency can be ensured while ensuring ejection stability in a configuration in which the metallic ink is ejected.

The invention is not limited to the above-mentioned embodiment and various variations can be made based on the description in the scope of the invention.

The invention can be also applied to liquid ejecting heads and liquid ejecting apparatuses other than the printer 1 on which the recording head 2 as exemplified in the above-mentioned embodiment is mounted. For example, the invention can be also applied to liquid ejecting heads that eject liquids containing flat plate-like particles, such as a coloring material ejecting head for a display manufacturing apparatus that ejects solutions of respective coloring materials of red (R), green (G), and blue (B), an electrode material ejecting head for an electrode forming apparatus that ejects a liquid-state electrode material, and a bioorganic ejecting head for a chip manufacturing apparatus that ejects a solution of bioorganic matter.

The entire disclosure of Japanese Patent Application No. 2012-236412, filed Oct. 26, 2012 is expressly incorporated by reference herein.

What is claimed is:

1. A combination of a liquid ejecting head and a glitter pigment liquid, the liquid ejecting head comprising:
- a nozzle configured to eject the liquid; and
- a pressure chamber communicating with the nozzle for ejecting the liquid through the nozzle by generating pressure fluctuation in the pressure chamber, wherein a flow path width Wc of the pressure chamber is equal to or larger than 60 μm;

the glitter pigment liquid containing glitter pigment comprising flat particles, the particles defining:
- R50, defined as a 50%-average particle diameter of a quasi-diameter obtained based on a maximum projected area of the glitter pigment;
- Rmax, defined as a maximum particle diameter of the quasi-diameter; and
- Z, defined as a thickness of the glitter pigment, taken in a direction perpendicular to the quasi-diameter;

wherein:

$0.8\ \mu m \leq R50 \leq 1.1\ \mu m$, $0.2 > Z/R50 \geq 0.02$, and $R\max/Wc < 0.1$.

2. The combination of claim 1, further comprising an additional pigment liquid, wherein the additional pigment liquid does not contain glitter pigment,
- wherein a weight per droplet of the first glitter pigment liquid that is ejected through the nozzle is less than a weight per droplet of the additional pigment liquid that is ejected through the nozzle, and
- wherein a flying speed of each droplet of the glitter pigment liquid that is ejected through the nozzle is less than a flying speed of each droplet of the additional pigment liquid that is ejected through the nozzle.

3. The combination of claim 1, further comprising an additional pigment liquid, wherein the additional pigment liquid does not contain glitter pigment, wherein a maximum ejection frequency of the glitter pigment liquid is less than a maximum ejection frequency of the additional pigment liquid.

4. A liquid ejecting apparatus comprising the liquid ejecting head and the glitter pigment liquid according to claim 1.

5. A liquid ejecting apparatus comprising the liquid ejecting head and the glitter pigment liquid according to claim 2.

6. A liquid ejecting apparatus comprising the liquid ejecting head and the glitter pigment liquid according to claim 3.

* * * * *